US012732975B2

(12) United States Patent
Jan et al.

(10) Patent No.: US 12,732,975 B2
(45) Date of Patent: Sep. 8, 2026

(54) COMMUNICATION METHOD, COMMUNICATION DEVICE, AND COMPUTER READABLE STORAGE MEDIUM

(71) Applicant: JRD COMMUNICATION (SHENZHEN) LTD., Shenzhen (CN)

(72) Inventors: Shahid Jan, Shenzhen (CN); Jia Sheng, Shenzhen (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 294 days.

(21) Appl. No.: 18/261,842

(22) PCT Filed: Jan. 18, 2021

(86) PCT No.: PCT/CN2021/072576
§ 371 (c)(1),
(2) Date: Jul. 18, 2023

(87) PCT Pub. No.: WO2022/151504
PCT Pub. Date: Jul. 21, 2022

(65) Prior Publication Data

US 2024/0080821 A1 Mar. 7, 2024

(51) Int. Cl.
*H04W 72/51* (2023.01)
*H04L 5/00* (2006.01)
*H04W 72/0453* (2023.01)

(52) U.S. Cl.
CPC ....... *H04W 72/0453* (2013.01); *H04L 5/0053* (2013.01); *H04W 72/51* (2023.01)

(58) Field of Classification Search
None
See application file for complete search history.

(56) References Cited

U.S. PATENT DOCUMENTS

2019/0357037 A1 11/2019 Velev et al.
2021/0329718 A1* 10/2021 Hu ........................ H04W 72/23
(Continued)

FOREIGN PATENT DOCUMENTS

CN 111345001 A 6/2020
CN 111434153 A 7/2020
(Continued)

OTHER PUBLICATIONS

European Search Report in European application No. 21918704.4, mailed on Oct. 8, 2024.
(Continued)

*Primary Examiner* — Kodzovi Acolatse
(74) *Attorney, Agent, or Firm* — PV IP PC; Wei Te Chung

(57) ABSTRACT

A wireless communication method applied to a base station side includes configuring an initial downlink bandwidth (BWP) of a reduced capability (REDCAP) user equipment through an information element, wherein the initial downlink BWP of the REDCAP user equipment is independent from an initial downlink BWP of a conventional user equipment, and time-frequency resources of the initial downlink BWP of the limited capacity user equipment are different from time-frequency resources of the initial downlink BWP of the conventional UE; and using the initial downlink BWP of the REDCAP user equipment to transmit initial access-related signals that is configured for the REDCAP user equipment.

9 Claims, 7 Drawing Sheets

(56) References Cited

U.S. PATENT DOCUMENTS

| | | | | |
|---|---|---|---|---|
| 2022/0225220 | A1* | 7/2022 | Vos | H04W 48/02 |
| 2022/0225392 | A1* | 7/2022 | Lee | H04W 72/23 |
| 2023/0072513 | A1* | 3/2023 | Fang | H04L 5/0053 |
| 2023/0106166 | A1* | 4/2023 | Oteri | H04L 5/0053 |
| 2023/0156752 | A1* | 5/2023 | Tuong Tran | H04L 5/0094 370/329 |
| 2023/0180110 | A1* | 6/2023 | Kim | H04W 48/02 370/329 |
| 2023/0224800 | A1* | 7/2023 | Murray | H04W 72/1273 370/329 |
| 2023/0379904 | A1* | 11/2023 | Kim | H04W 74/0838 |
| 2025/0031188 | A1* | 1/2025 | Kim | H04L 5/0016 |

FOREIGN PATENT DOCUMENTS

| | | | |
|---|---|---|---|
| CN | 111567126 | A | 8/2020 |
| CN | 112075113 | A | 12/2020 |
| WO | 2020031275 | A1 | 2/2020 |
| WO | 2020052786 | A1 | 3/2020 |

OTHER PUBLICATIONS

NP1: Lenovo et al:"UE complexity reduction features for RedCap", 3GPP DRAFT;R1-2008294,(Nov. 1, 2020).

NP2: Vivo et al:"Framework and Principles for Reduced Capability NR devices",3GPP Draft;R1-2005386, (Aug. 8, 2020).

NP3: Vivo et al:"Framework and Principles for Reduced Capability NR devices",3GPP Draft;R1-2007671, (Nov. 1, 2020).

International Search Report in International application No. PCT/CN2021/072576,mailed on Oct. 12, 2021.

Written Opinion of the International Search Authority in International application No. PCT/CN2021/072576,mailed on Oct. 12, 2021.

Chinese Office Action issued in corresponding Chinese Patent Application No. 202180091170.3 dated Jul. 13, 2026, pp. 1-12.

NPL1:ZTE et al.:"Potential UE Complexity reduction features", 3GPP TSG RAN WG1 #103-e e-meeting; R1-2007715;Nov. 2, 2020.

NPL2:Xiaomi et al.:"Discussion on the complexity reduction for reduced capability device",3GPP TSG RAN WG1 #103-e e-meeting;R1-2008084;Nov. 2, 2020.

NPL3:ZTE et al.:"UE complexity reduction for reduced capability NR devices",3GPP TSG RAN WG1 #104-e e-meeting;R1-2100564;Jan. 18, 2021.

* cited by examiner

COMMUNICATION METHOD, COMMUNICATION DEVICE, AND COMPUTER READABLE STORAGE MEDIUM

CROSS REFERENCE TO RELATED APPLICATIONS

This application is a US national phase application based upon an International Application No. PCT/CN2021/072576, filed on Jan. 18, 2021, and entitled "COMMUNICATION METHOD, COMMUNICATION DEVICE, AND COMPUTER READABLE STORAGE MEDIUM". The entire disclosures of the above application are incorporated herein by reference.

TECHNICAL FIELD

The present application relates to the communication field, in particular to a communication method, a communication device, and a computer readable storage medium.

BACKGROUND

Wireless communication systems and networks, such as 5th generation (5G) mobile communication standards and technologies, are well known. The 5G standards and technologies are being developed by 3rd Generation Partnership Project (3G Partnership Project, 3GPP). Currently, 3GPP is researching the project "Support Research on NR Devices with Reduced Capability (REDCAP)".

Use cases for REDCAP user equipment include industrial wireless sensors, video surveillance, and wearable devices. The main requirement for REDCAP user equipment is to reduce equipment cost and complexity compared to high performance user equipment. There are also specific requirements such as data rate, latency, battery life, availability, and reliability.

After long-term research, the inventors have found that bandwidth reduction can effectively reduce the cost and power consumption of the REDCAP user equipment. However, the current REDCAP user equipment requires frequent RF retuning (Radio frequency returning) during an initial access process or a paging process as the bandwidth decreases. That is, reselection and adjustment of the bandwidth frequency to complete a target operation. This introduces additional power consumption and latency to the REDCAP user equipment.

SUMMARY OF INVENTION

The technical problem mainly solved by the present application is to provide a communication method, a communication device, and a computer-readable storage medium, which can solve the issue of extra power consumption and delay caused by a frequent RF readjustment of REDCAP user equipment in the prior art.

In order to solve the above technical problems, a first aspect of the present application provides a communication method, which is applied to a base station side, and the method includes: determining an initial downlink bandwidth (BWP) of the REDCAP user equipment, wherein the initial downlink subset bandwidth (BWP) is a BWP used for initial access, an initial downlink BWP of the REDCAP user equipment is independent from an initial downlink BWP of a conventional user equipment; and using the initial downlink BWP of the REDCAP user equipment to transmit an initial access-related signals that is configured for the REDCAP user equipment.

In order to solve the above technical problems, a second aspect of the present application provides a communication method, which is applied to a base station side, and the method includes determining at least one active BWP of the REDCAP user equipment, wherein the at least one active BWP is different from an initial downlink BWP of the REDCAP user equipment; configuring a dedicated paging occasion for the REDCAP user equipment in the active BWP.

In order to solve the above technical problems, a third aspect of the present application provides a communication method, which is applied to a base station side, and the method includes obtaining information of a REDCAP user equipment, wherein the information of the REDCAP user equipment includes a maximum bandwidth supported by the REDCAP user equipment, and the maximum bandwidth is greater than a preset value.

In order to solve the above technical problems, a fourth aspect of the present application provides a communication method, which is applied to a REDCAP user equipment, and the method includes determining an initial downlink BWP of the REDCAP user equipment, wherein the initial downlink bandwidth (BWP) is a BWP used for initial access, the initial downlink BWP of the REDCAP user equipment is independent from an initial downlink BWP of a conventional user equipment; and using the initial downlink BWP of the REDCAP user equipment to receive initial access-related signals.

In order to solve the above technical problems, a fifth aspect of the present application provides a communication method, which is applied to a REDCAP user equipment, and the method includes receiving a configuration information of a dedicated paging occasion from a base station, wherein a time-frequency resource of the dedicated paging occasion belongs to at least one active BWP of the REDCAP user equipment, and the at least one active BWP is a BWP used for data traffic transmission.

In order to solve the above technical problems, a sixth aspect of the present application provides a communication method, which is applied to a REDCAP user equipment, and the method includes reading information of the REDCAP user equipment; transmitting the information of the REDCAP user equipment to a base station, wherein the information of the REDCAP user equipment includes a maximum bandwidth supported by the REDCAP user equipment, and the maximum bandwidth is greater than a preset value.

In order to solve the above technical problem, the first aspect of the present application provides a communication device, the communication device includes a processor and a memory, the memory is used to store a program data, and the program data can be executed by the processor, so as to implement to the method provided in any one of the first aspect, the second aspect, or the third aspect of the present application.

In order to solve the above technical problem, the second aspect of the present application provides a communication device, the communication device includes a processor and a memory, the memory is used to store a program data, and the program data can be executed by the processor, so as to implement to the method provided in any one of the third aspect, the fourth aspect, or the fifth aspect of the present application.

In order to solve the above technical problem, the present application provides a computer readable storage medium storing a program data, which is characterized in that the program data can be executed by a processor to implement the aforementioned method.

The beneficial effect of this present application includes that: Determine an initial downlink bandwidth (BWP) of a REDCAP user equipment, wherein the initial downlink BWP of the REDCAP user equipment is independent from an initial downlink BWP of a conventional user equipment; Use the initial downlink BWP of the REDCAP user equipment to transmit initial access-related signals configured for the REDCAP user equipment, and when transmitting, the initial downlink BWP of the REDCAP user equipment and the initial downlink BWP of the conventional user equipment are time-division multiplexed or frequency-division multiplexed. By using the independent initial downlink BWP, compared with the REDCAP user equipment and a common initial downlink BWP of the conventional user equipment in the prior art, the REDCAP user equipment can completely receive the initial access-related signal in the independent initial downlink BWP, which reduces power consumption of the REDCAP user equipment.

BRIEF DESCRIPTION OF THE DRAWINGS

In order to illustrate the technical solutions more clearly in the embodiments of the present application, the following briefly introduces the drawings that need to be used in the description of the embodiments. Apparently, the drawings in the following description are only some embodiments of the present application. For those skilled in the art, other drawings can also be obtained based on these drawings without creative effort, wherein.

DETAILED DESCRIPTION OF ILLUSTRATED EMBODIMENTS

The technical solutions in the embodiments of the present application will be clearly and completely described below in conjunction with the drawings in the embodiments of the present application. Apparently, the described embodiments are only some of the embodiments of the present application, rather than all the embodiments. Based on the embodiments in this application, all other embodiments obtained by persons of ordinary skill in the art without making creative efforts belong to the scope of protection of the present application.

"Initial downlink bandwidth (BWP)" in this application may represent "initial downlink bandwidth part (BWP)", where BWP may represent bandwidth part (Bandwidth Part, BWP). "Information element" in this application may represent an "IE (Information Element)". A "user equipment" in the present application may include or represent any portable computing device used for communication. Examples of user equipment that may be used in certain embodiments of the described devices, methods, and systems may be wired or wireless devices. Examples include mobile devices, mobile phones, terminals, smartphones, portable computing devices such as laptops, handhelds, tablets, tablets, netbooks, personal digital assistants, music players, and other computing devices capable of wired or wireless communication. In addition, the user equipment may also be a reduced capability user equipment.

Figure 1:
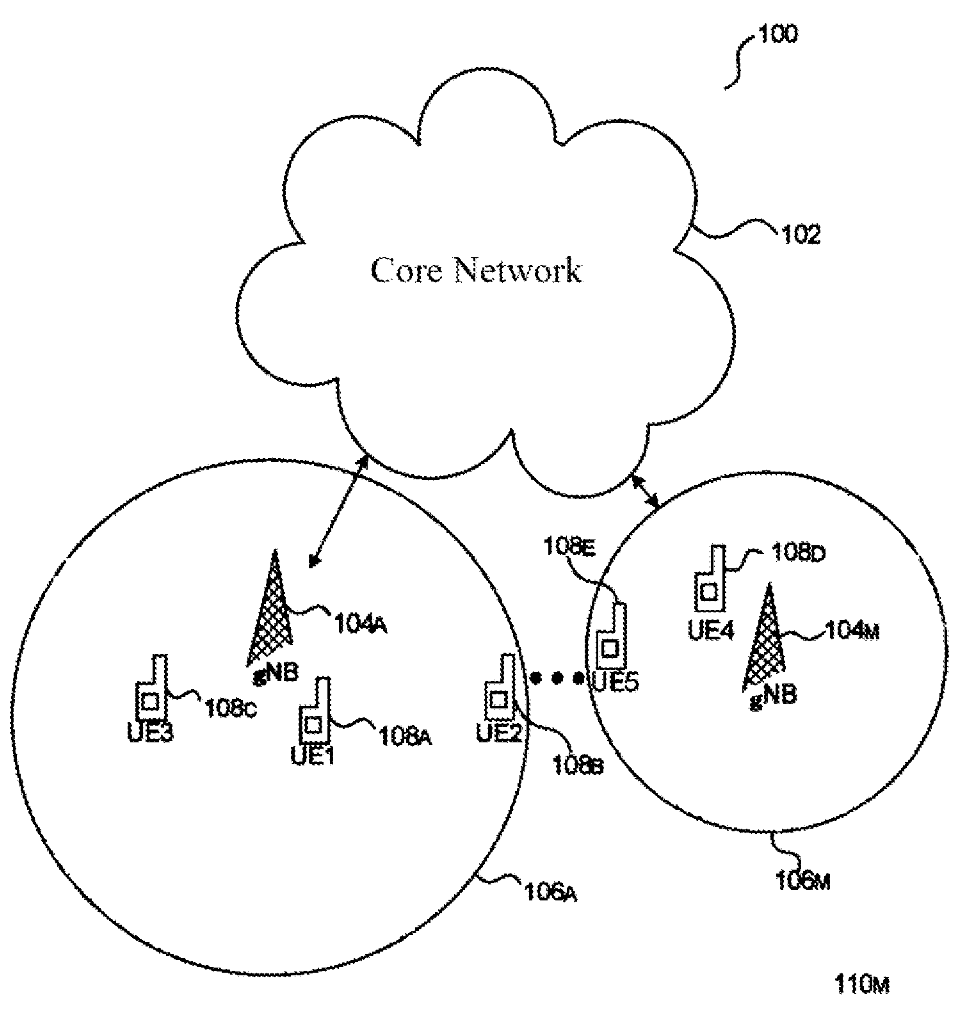
FIG. 1 is a schematic structural diagram of a wireless communication system or a network according to an embodiment of the present application.

FIG. 1 is a schematic diagram of a wireless communication system or a network 100 including a core network 102 (or telecommunications infrastructure) and having a plurality of network nodes 104*a*-104*m* (e.g., base stations gNB) serving cells 106*a*-106*m* of a plurality of wireless communication units 108*a*-108*e* (e.g., UEs). The plurality of network nodes 104*a*-104*m* are connected to the core network 102 by links. The links may be wired or wireless (e.g., radio communication links, fiber optics, etc.). The core network 102 may include a plurality of core network nodes, network entities, application servers, or any other networks or computing devices that may communicate with one or more radio access networks including the plurality of network nodes 104*a*-104*m*.

Figure 3:
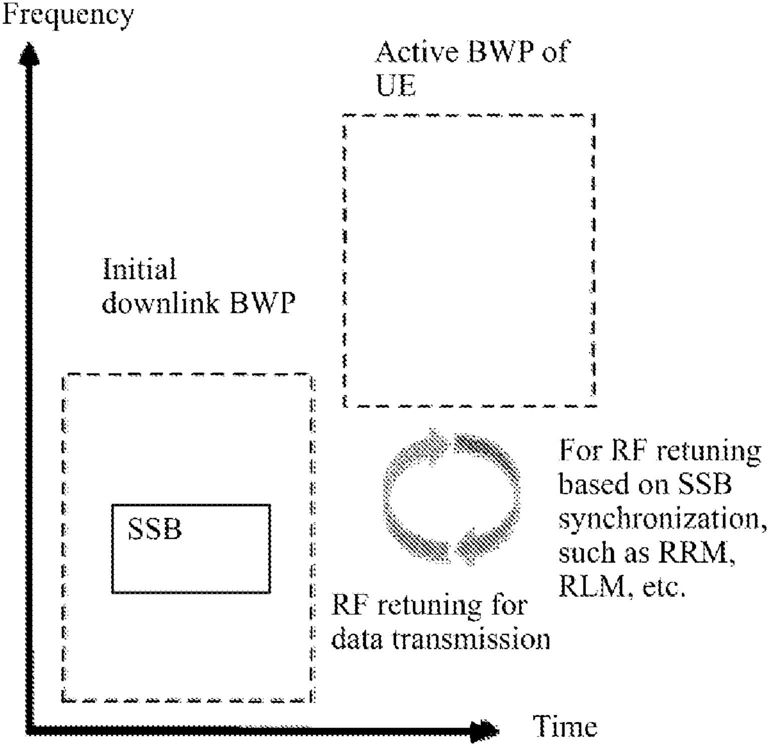
FIG. 3 is a schematic diagram of a frequent RF retuning between an initial downlink BWP and an active BWP by a REDCAP user equipment in the related art.

In this example, the network nodes 104*a*-104*m* are illustrated as base stations, such as but not limited to, which may be gNBs in a 5G network. Each of the plurality of network nodes 104*a*-104*m* (e.g., base stations) has a footprint. For simplicity and by way of example and without limitation, corresponding circular cells 106*a*-106*m* serving one or more UEs 108*a*-108*e* are schematically represented in FIG. 3. UEs 108*a*-108*e* are capable of receiving services from the wireless communication system 100, such as voice, video, audio, or other communication services.

The wireless communication system or the network 100 may include or represent any one or more communication networks for communication between UEs 108*a*-108*e* and other devices, content sources, or servers connected to the wireless communication system or network 100. The core network 102 may also include or represent one or more communication networks that are linked, coupled or connected to form the wireless communication system or network 100, one or more network nodes, entities, elements, application servers, servers, base stations or other network devices. Links or couplings between network nodes may be wired or wireless (e.g., radio communication links, optical fibers, etc.). The wireless communication system or network 100 and core network 102 may include any suitable combination of a core network and a radio access network comprising network nodes or entities, base stations, access points, and the like. It enables communication between UEs 108*a*-108*e*, wireless communication system 100, and network nodes 104*a*-104*m* of core network 102, content sources, and/or other devices connected to the system or network 100.

An example of a wireless communication network 100 that may be used in some embodiments of the described devices, methods, and systems may be at least one communication network or combination thereof, including, but not limited to, one or more wired and/or wireless telecommunications networks, one or more core networks, one or more radio access networks, one or more computer networks, one or more data communication networks, the Internet, telephone networks, wireless networks, such as WiMAX, WLAN and/or Wi-Fi networks based on the IEEE802.11 standard as examples only, or Internet Protocol (IP) network, a packet-switched network or enhanced packet-switched network, IP Multimedia Subsystem (IMS) network or communication network based on wireless, cellular or satellite technology such as mobile network, Global System for Mobile Communications (GSM), GPRS network, Wideband Code Division Multiple Access (W-CDMA), CDMA2000 or LTE/LTE-Advanced communication network or any 2nd, 3rd, 4th or 5th generation and beyond communication network, etc.

In an example of FIG. 1, the wireless communication system 100 may be, by way of example only and not limitation, a 5G communication network using cyclic prefix orthogonal frequency division multiplexing (CP-OFDM) technology for downlink and uplink channels. The downlink may include one or more communication channels for transmitting data from one or more gNBs 104*a*-104*m* to one or more UEs 108*a*-108*e*. Typically, a downlink channel is a communication channel used to transmit data, e.g., from gNB 104*a* to UE 108*a*.

Both uplink and downlink for 5G networks are divided into radio frames (e.g., each frame may be 10 ms in length). Each frame can be divided into multiple subframes. For example, each frame may include 10 subframes of equal length. Each subframe consists of multiple slots (for example, 2 slots) for transmitting data. In addition to slots, a subframe may include several additional special fields or OFDM symbols. A subframe may include, by way of example only, downlink synchronization symbols, broadcast symbols, and/or uplink reference symbols.

Figure 2:
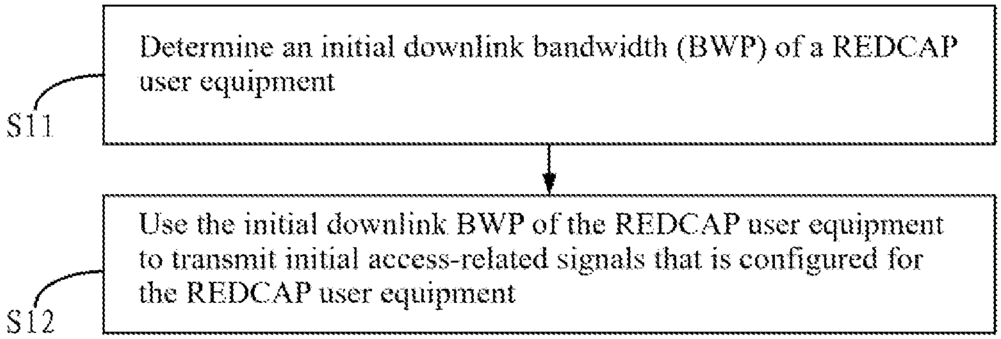
FIG. 2 is a schematic flowchart of a communication method according to a first embodiment of the present application.

As shown in FIG. 2, a first embodiment of the communication method of the present application includes that:

S11: Determine an initial downlink bandwidth (BWP) of a REDCAP user equipment.

This embodiment is applied to a base station side. A UE may be configured with one or more BWPs. At the same moment of uplink or downlink, a UE activates at most one BWP. The initial downlink bandwidth is used to transmit an initial-access related signal.

After the UE is started, the UE needs to find a wireless network and establish a connection with the UE. The specific process includes cell search, cell selection, initial access, random access and so on. During the initial access process, the UE detects a synchronization signal, achieves downlink synchronization of a cell, and receives system information. A base station may transmit initial-access related signals in an initial downlink bandwidth (BWP) of the UE. The initial-access related signals are signals that the UE needs to receive to complete the initial access process. The initial access-related signal may include a synchronization signal, a physical broadcast channel PBCH block (SSB), and a control resource set CORESET #0. CORESET #0 includes time-frequency resources used for scheduling downlink control information of system information block (SIB)1. In addition, the initial access related signal may further include a Physical Downlink Shared Channel (PDSCH) for carrying the SIB.

Figure 4:
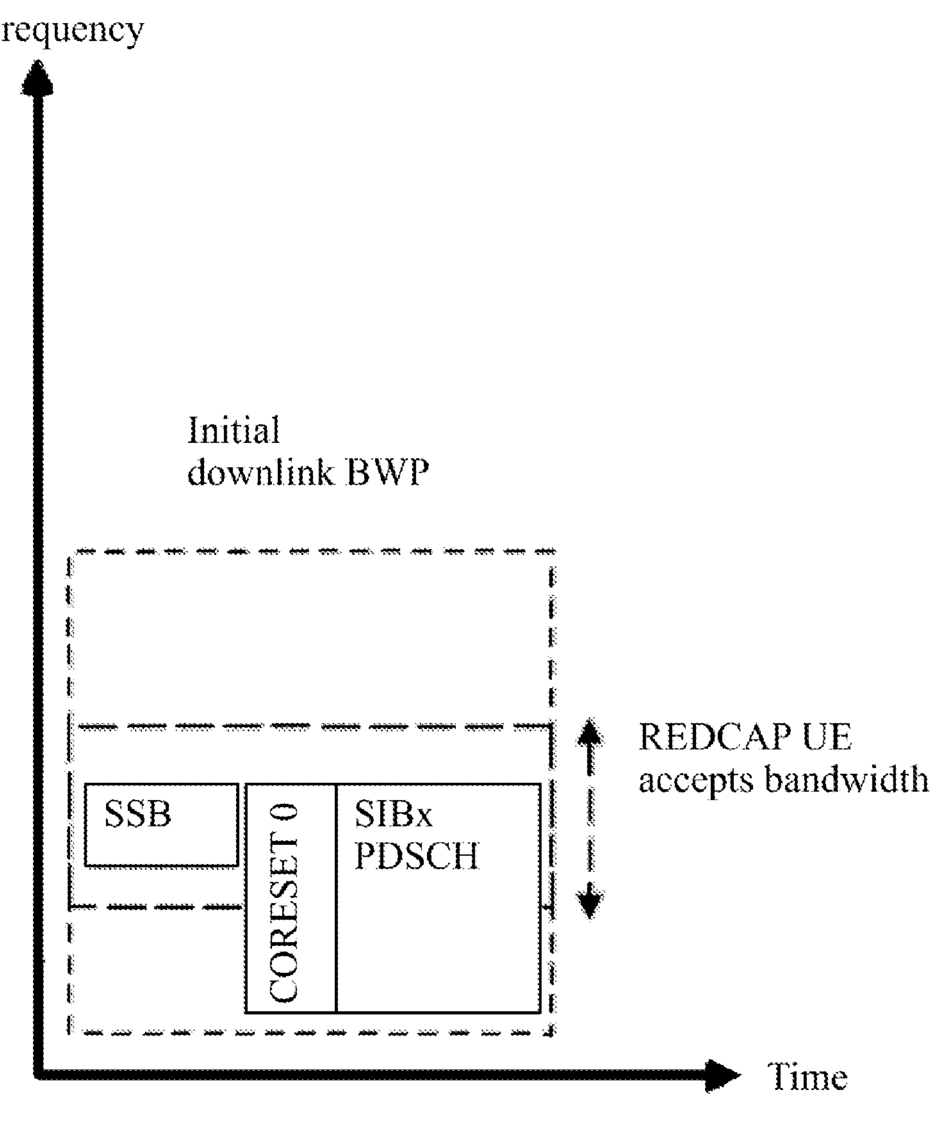
FIG. 4 is a schematic diagram of a related art that a REDCAP user equipment cannot completely receive information related to initial access.

The configuration of the initial access-related signal is completed by base station scheduling. In the related art, the base station does not configure an independent initial downlink BWP for the REDCAP user equipment. The REDCAP user equipment shares the initial downlink BWP and the initial-access related signal with the conventional user equipment. The REDCAP user equipment needs to perform radio frequency RF retuning to the initial downlink BWP during initial access or synchronization, and then performs radio frequency RF retuning to the active BWP for user data transmission, as shown in FIG. 3. Frequent RF retuning introduces additional power consumption and latency. In addition, the bandwidth of the REDCAP user equipment is limited, and the bandwidth of the REDCAP user equipment may not be able to fully initially access the frequency band used by the relevant signal, as shown in FIG. 4, thus adversely affecting the initial access of the REDCAP user equipment.

In the present application, the initial downlink BWP of the REDCAP user equipment is independent from the initial downlink BWP of the conventional user equipment. The base station can read the initial downlink BWP of the REDCAP user equipment from data stored by itself or obtain the initial downlink BWP of the REDCAP user equipment from a higher layer information element (IE). For example, the initial downlink BWP of the REDCAP user equipment is determined through the higher layer information element in the information obtained from other base stations or the core network. Specific and feasible ways are not limited thereto.

An example of the higher layer IE or its fields used to configure the initial downlink bandwidth of the REDCAP user equipment is as follows, where the bold part is used to configure the initial downlink BWP of the REDCAP user equipment:

```
DownlinkConfigCommonSIB ::=        SEQUENCE {
   frequencyInfoDL                    FrequencyInfoDL-SIB,
   initialDownlinkBWP                 BWP-DownlinkCommon,
   initialDownlinkkBWP-RedCap           BWP-DownlinkCommon,
   bcch-Config                        BCCH-Config,
   pcch-Config                        PCCH-Config,
   ...
}
```

initialDownlinkBWP-RedCap : The dedicated (RedCap UE-specific) configuration for the initial access downlink bandwidth-part

S12: Use the initial downlink BWP of the REDCAP user equipment to transmit initial access-related signals that is configured for the REDCAP user equipment.

Figure 5:
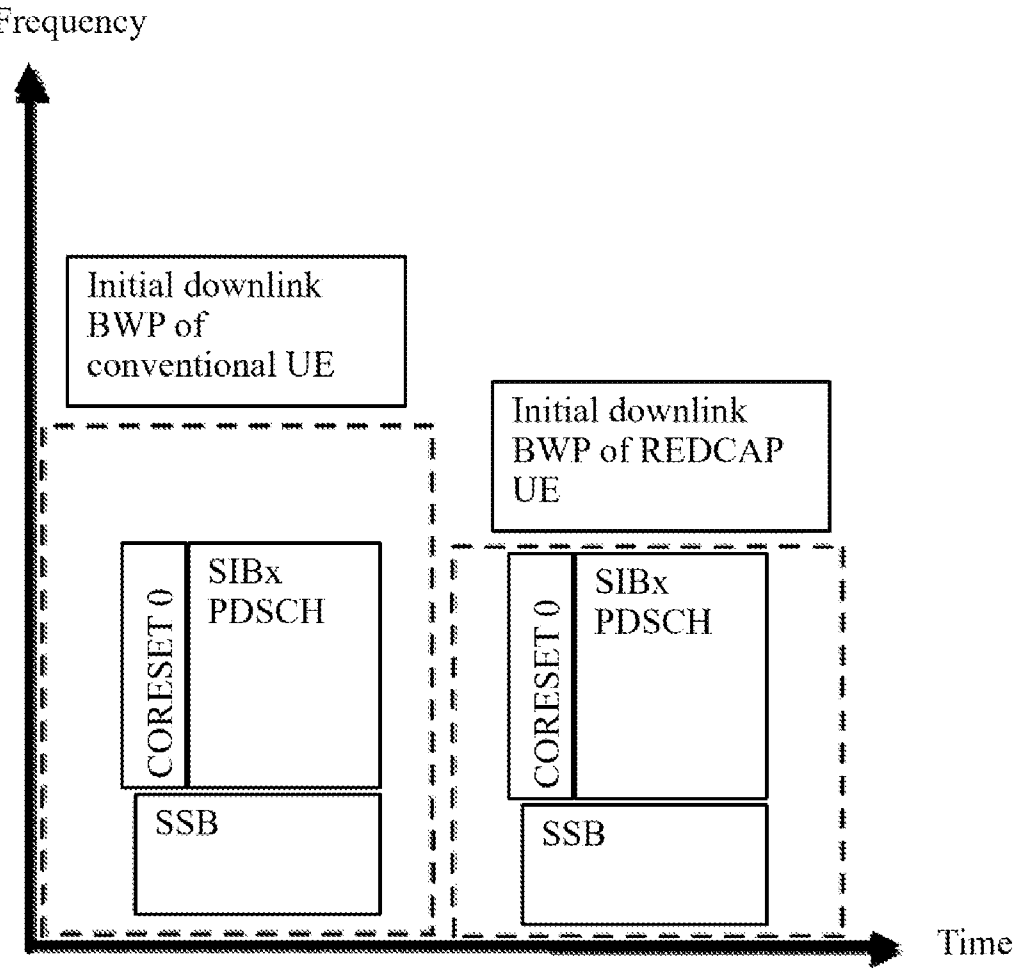
FIG. 5 is a schematic diagram of time-division multiplexing of an initial downlink BWP of a REDCAP user equipment and an initial downlink BWP of a conventional user equipment.
Figure 6:
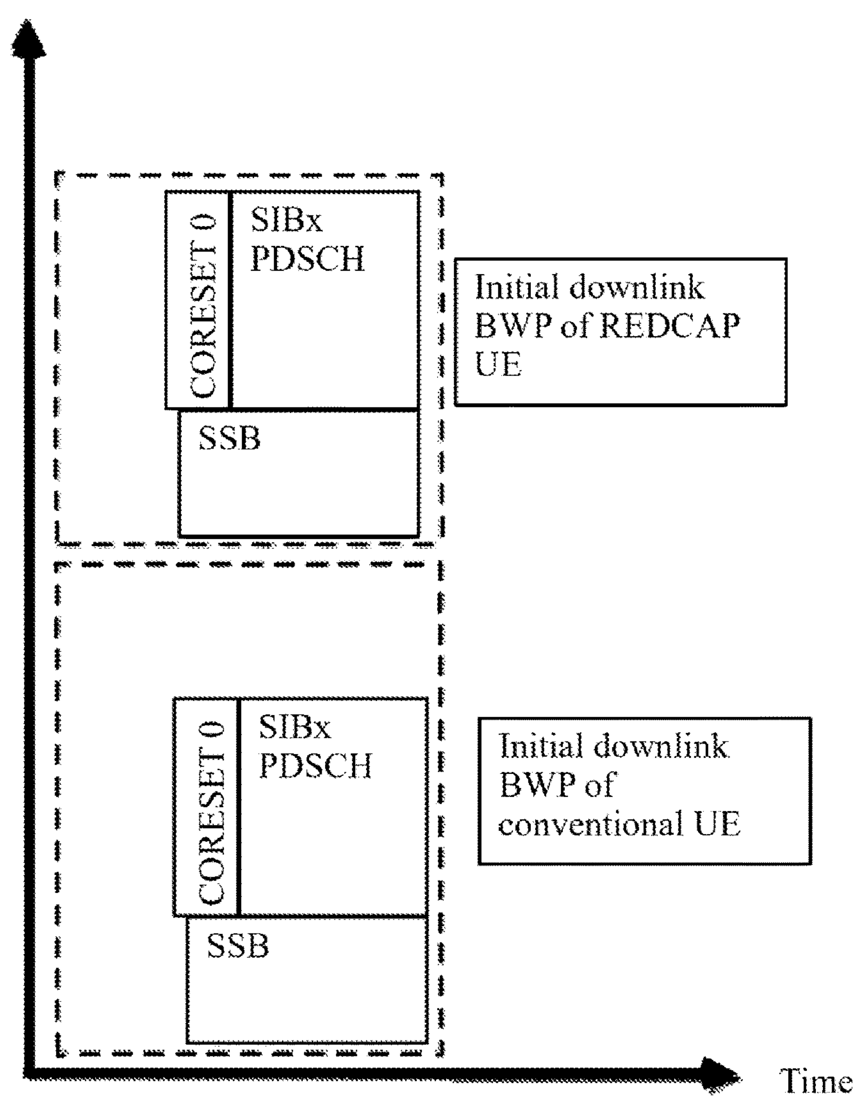
FIG. 6 is a schematic diagram of frequency division multiplexing of an initial downlink BWP of a REDCAP user equipment and an initial downlink BWP of a conventional user equipment.

Optionally, the initial downlink BWP of the REDCAP user equipment may be time division multiplexed with the initial downlink BWP of the conventional user equipment, as shown in FIG. 5. Alternatively, the initial downlink BWP of the REDCAP user equipment may be frequency division multiplexed with the initial downlink BWP of the conventional user equipment, as shown in FIG. 6.

Through the implementation of this embodiment, the REDCAP user equipment is configured with a dedicated initial downlink BWP. The base station uses the dedicated initial downlink BWP to transmit the initial access-related signals configured for the REDCAP user equipment. This thereby reduces the power consumption and delay caused by RF retuning between the active BWP and the initial downlink BWP of the conventional UE for the REDCAP UE and can reduce the occurrence of a situation where the frequency band used by the initial access-related signal exceeds the bandwidth supported by the REDCAP user equipment.

Figure 7:
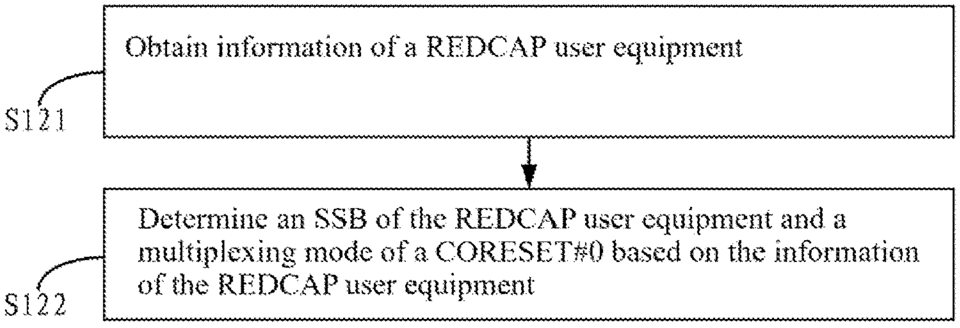
FIG. 7 is a specific flowchart of S12 in FIG. 2.

Optionally, as shown in FIG. 7, in a specific embodiment of the present application, S12 includes:

S121: Obtain information of a REDCAP user equipment.

In the related art, under FR1, a maximum bandwidth of the REDCAP user equipment is 20 MHz. For some use cases, such as a smart wearable device with a small form factor and a single receive antenna, it may not be able to support high data rates up to 150 Mbps with a maximum bandwidth of 20 MHz. Therefore, it is possible to select to increase the maximum bandwidth of the REDCAP user equipment under FR1, for example, to 25 MHz, 30 MHz, 35 MHz, or 40 MHz. Therefore, the obtained information of the REDCAP user equipment includes a maximum bandwidth of 40 MHz. Under FR2, a maximum bandwidth of the REDCAP user equipment is 100 MHz.

S122: Determine an SSB of the REDCAP user equipment and a multiplexing mode of a CORESET #0 based on the information of the REDCAP user equipment.

There are three multiplexing modes when SSB and CORESET #0 are sent, which are used in FR1 and FR2 respectively. The frequency range (FR) of 5G NR includes FR1 and FR2. The frequency range of FR1 is 450 MHz-6000 MHz. The frequency range of FR2 is 24250 MHz-52600 MHz. In FR1, multiplexing mode 1 is used to multiplex SSB and CORESET #0. At this time, SSB and CORESET #0 are time division multiplexed in time domain, and the frequency domain range of CORESET #0 includes the frequency domain range of SSB. In FR2, Mode 2 and Mode 3 can be used for frequency division multiplexing.

Optionally, determining the SSB of the priority user equipment and the multiplexing mode of CORESET #0 includes reducing the use of multiplexing mode 2 whose subcarrier spacing is {240 KHz, 120 KHz}.

In FR2, when SSB and CORESET #0 are multiplexed to select the subcarrier spacing {120 KHz, 240 KHz} in mode 2, the bandwidth occupied by the multiplex is less than 100 MHz. When SSB and CORESET #0 are multiplexed to select the subcarrier spacing {240 KHz, 120 KHz} in mode 2, the bandwidth occupied by the multiplexing is greater than 100 MHz. When SSB and CORESET #0 are multiplexed to select mode 3, the subcarrier spacing is {120 KHz, 120 KHz}, and the bandwidth occupied by the multiplexing is less than 100 MHz.

Due to the limited maximum bandwidth of the REDCAP user equipment, when the multiplexing mode 2 subcarrier spacing is selected to be {240 KHz, 120 KHz}, the REDCAP user equipment may select to perform RF retuning in a time-division manner to receive SSB and CORESET #0 respectively because the maximum supported bandwidth cannot completely cover the multiplexing bandwidth. This prolongs the synchronization process and increases the power consumption of the REDCAP user equipment. Therefore, in order to meet the needs of REDCAP user equipment as much as possible and reduce its power consumption, when selecting a multiplexing mode for the REDCAP user equipment with a working frequency band of FR2, the use of multiplexing mode 2 with a subcarrier spacing of {240 KHz, 120 KHz} can be reduced.

Figure 8:
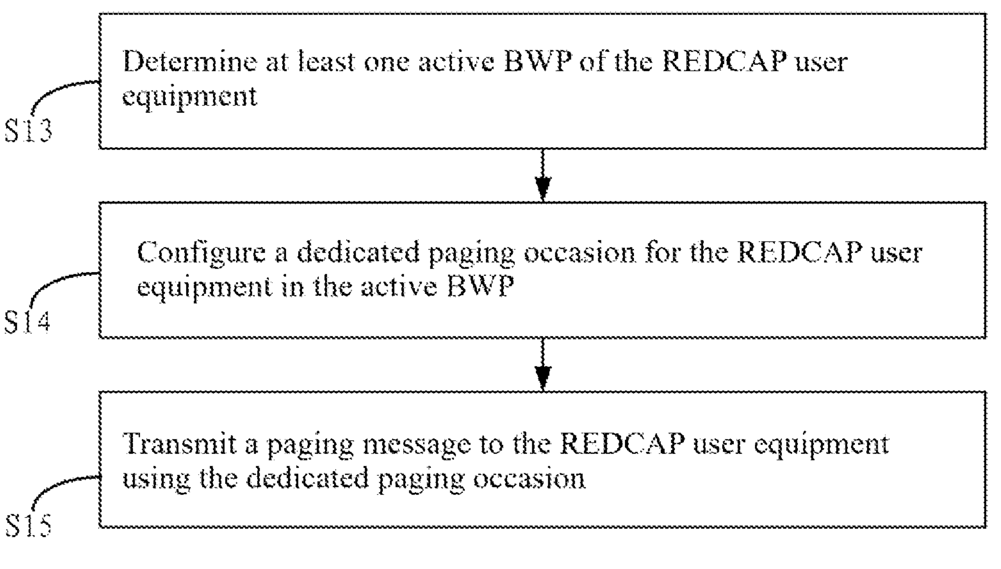
FIG. 8 is a schematic flowchart of a communication method according to a second embodiment of the present application.

As shown in FIG. 8, a second embodiment of the communication method of the present application includes:

S13: Determine at least one active BWP of the REDCAP user equipment.

S14: Configure a dedicated paging occasion for the REDCAP user equipment in the active BWP.

S15: Transmit a paging message to the REDCAP user equipment using the dedicated paging occasion.

After establishing a connection with the base station, the REDCAP user equipment may switch to at least one active BWP, and the bandwidth of the active BWP may be smaller than the initial downlink BWP to reduce power consumption of the REDCAP user equipment.

The paging occasion is a group of PDCCH monitoring occasions, which may be composed of multiple time slots, subframes, or OFDM symbols, and paging DCI may be sent. The REDCAP user equipment may enter a radio resource control (RRC) idle state (RRC_IDLE) or an RRC inactive state (RRC_INACTIVE) when there is no data service transmission. At this time, the REDCAP user equipment may enable discontinuous reception (DRX), and periodically monitor paging opportunities.

In the related art, the paging occasion is generally set in the initial downlink BWP. However, the REDCAP user equipment often enters an idle state or an inactive state when an active BWP is active. This means that in order to monitor the paging occasion, the REDCAP UE needs to frequently perform RF retuning to switch from the active BWP to the initial downlink BWP.

In this embodiment, a dedicated paging occasion is configured for the REDCAP user equipment in at least one active BWP. In this way, the REDCAP user equipment in the idle state or the inactive state can directly monitor the paging occasion on the current active BWP. There is no need to perform RF readjustment to switch to the initial downlink BWP, which saves power consumption of the REDCAP user equipment.

The configuration information of the dedicated paging occasion can be carried by a higher layer (such as the RRC layer) information element. The example is as follows, where the bold part is used to configure the dedicated paging occasion:

| | | |
|---|---|---|
| PDCCH-ConfigCommon ::= | SEQUENCE { | |
| controlResourceSetZero | ControlResourceSetZero | OPTIONAL, -- Cond InitialBWP |
| **controlResourceSetZero** | **ControlResourceSetZero** | **OPTIONAL, -- Need R OtherBWP** |
| commonControlResourceSet | ControlResourceSet | OPTIONAL, -- Need R |
| searchSpaceZero | SearchSpaceZero OPTIONAL, | -- Cond InitialBWP-Only |
| commonSearchSpaceList | SEQUENCE (SIZE(1..4)) OF SearchSpace | OPTIONAL, -- Need R |
| searchSpaceSIB1 | SearchSpaceId | OPTIONAL, -- Need S |
| searchSpaceOtherSystemInformation | SearchSpaceId | OPTIONAL, -- Need S |

The configuration information of the dedicated paging occasion can be carried by the paging search space configuration. The example is as follows, where the bold part is used to configure the dedicated paging occasion:

```
pagingSearchSpace
SearchSpaceId                   OPTIONAL,   -- Need S
ra-SearchSpace                          SearchSpaceId          OPTIONAL,   -- Need S
...,
[[
firstPDCCH-MonitoringOccasionOfPO          CHOICE {
    sCS15KHZoneT                               SEQUENCE (SIZE (1..maxPO-perPF)) OF INTEGER (0..139),
sCS30KHZoneT-SCS15KHZhalfT                          SEQUENCE (SIZE (1..maxPO-perPF)) OF INTEGER (0..279),
sCS60KHZoneT-SCS30KHZhalfT-SCS15KHZquarterT SEQUENCE (SIZE (1..maxPO-perPF)) OF INTEGER (0..559),
S120KHZoneT-SCS60KHZhalfT-SCS30KHZquarterT-SCS15KHZoneEighthT SEQUENCE (SIZE (1..maxPO-perPF)) OF
INTEGER (0..1119),
sCS120KHZhalfT-SCS60KHZquarterT-SCS30KHZoneEighthT-SCS15KHZoneSixteenthT SEQUENCE (SIZE
(1..maxPO-perPF)) OF INTEGER (0..2239),
sCS120KHZquarterT-SCS60KHZoneEighthT-SCS30KHZoneSixteenthT        SEQUENCE (SIZE (1..maxPO-perPF)) OF
INTEGER (0..4479),
sCS120KHZoneEighthT-SCS60KHZoneSixteenthT   EQUENCE (SIZE (1..maxPO-perPF)) OF INTEGER (0..8959),
  sCS120KHZoneSixteenthT                          SEQUENCE (SIZE (1..maxPO-perPF)) OF INTEGER (0..17919)
    }
OPTIONAL                        -- Cond OtherBWP
    ]]
}
```

OtherBWP This field is optionally present, Need R, if this BWP is not the initial DL BWP and pagingSearchSpace is configured in this BWP. Otherwise this field is absent.

The time-frequency resource of the dedicated paging occasion belongs to at least one active BWP of the REDCAP user equipment. The configuration information of the dedicated paging occasion is carried by higher layer information element and/or a paging search space configuration.

Figure 9:
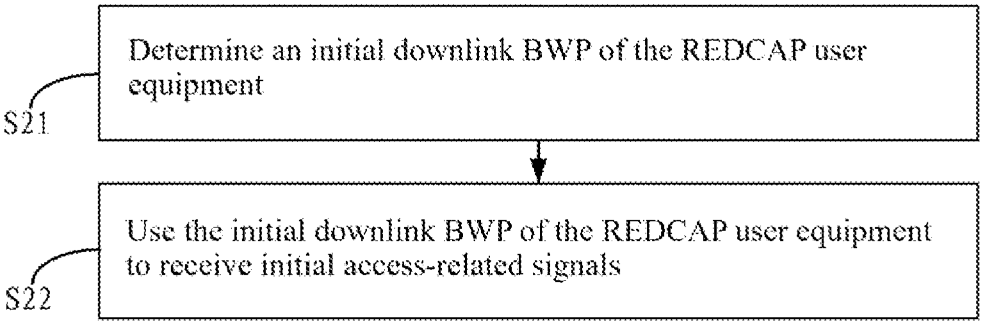
FIG. 9 is a schematic flowchart of a communication method according to a third embodiment of the present application.

As shown in FIG. 9, a third embodiment of the communication method of the present application includes:

S21: Determine an initial downlink BWP of the REDCAP user equipment.

S22: Use the initial downlink BWP of the REDCAP user equipment to receive initial access-related signals.

This embodiment is applied to the user equipment side. The user equipment may read the initial downlink bandwidth BWP from the local memory. For the parts in this example that are the same as or similar to those in the specific embodiment corresponding to FIG. 7, reference may be made to the description in the specific embodiment corresponding to FIG. 7 and will not be repeated here.

Figure 10:
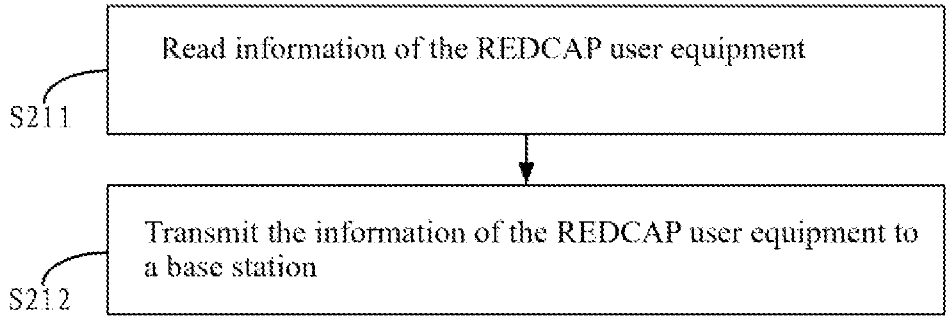
FIG. 10 is a specific flowchart diagram of S21 in FIG. 9.

As shown in FIG. 10, in a specific embodiment of the present application, S21 includes:

S211: Read information of the REDCAP user equipment.

S212: Transmit the information of the REDCAP user equipment to a base station.

This embodiment is applied to the user equipment side. The REDCAP user equipment can read its own information from the local memory and transmit it to the base station side.

The information of the REDCAP user equipment includes a maximum bandwidth supported by the REDCAP user equipment, wherein the maximum bandwidth is greater than a preset value.

Optionally, when the working frequency band of the REDCAP user equipment is FR1, the default value is 20 MHz. The information of the REDCAP user equipment includes that the maximum bandwidth supported by the REDCAP user equipment is 40 MHz.

For specific content, reference may be made to the description in the specific embodiment corresponding to FIG. 7, which will not be repeated here.

Figure 11:
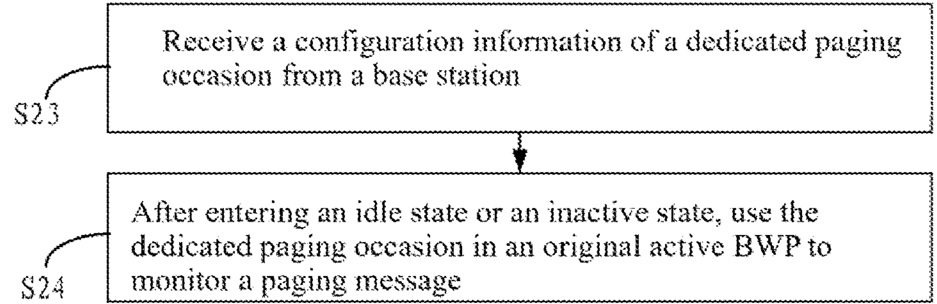
FIG. 11 is a schematic flowchart of a communication method according to a fourth embodiment of the present application.

As shown in FIG. 11, a fourth embodiment of the communication method of the present application includes:

S23: Receive a configuration information of a dedicated paging occasion from a base station.

S24: After entering an idle state or an inactive state, use the dedicated paging occasion in an original active BWP to monitor a paging message.

The original active BWP is an active BWP used before the REDCAP user equipment enters the idle state or the inactive state.

This embodiment is applied to the user equipment side. For the parts in this example that are the same as or similar to those in the specific embodiment corresponding to FIG. 8, reference may be made to the description in the specific embodiment corresponding to FIG. 8 and will not be repeated here.

Figure 12:
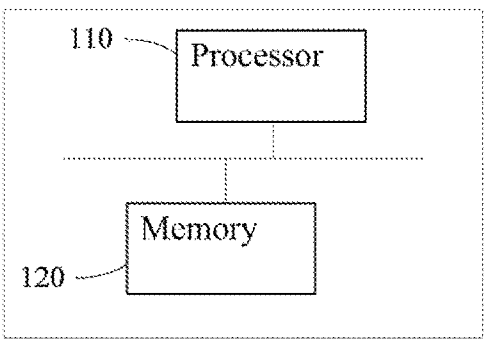
FIG. 12 is a schematic structural diagram of a communication device according to a first embodiment of the present application.

As shown in FIG. 12, the first embodiment of the communication device of the present application includes a processor 110 and a memory 120.

The processor 110 controls the operation of the communication device. The processor 110 may also be referred to as a CPU (Central Processing Unit). The processor 110 may be an integrated circuit chip, capable of processing signal sequences. The processor 110 can also be a general-purpose processor, a digital signal sequence processor (DSP), an application-specific integrated circuit (ASIC), an off-the-shelf programmable gate array (FPGA) or other programmable logic devices, discrete gate or transistor logic devices, discrete hardware components. A general-purpose processor may be a microprocessor, or the processor may be any conventional processor, or the like.

The memory 120 stores instructions and data required for the processor 110 to work.

The processor 110 is configured to execute instructions to implement the methods provided in the first and/or second embodiments and possible combinations of the hybrid automatic repeat request feedback method of the present application.

Figure 13:
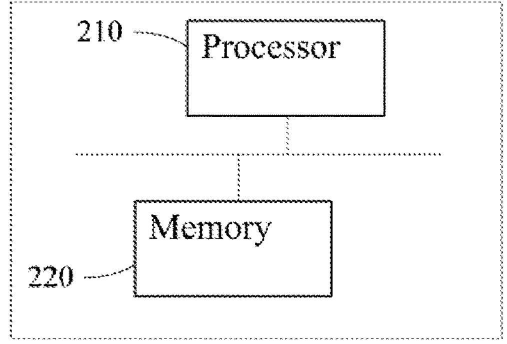
FIG. 13 is a schematic structural diagram of a communication device according to a second embodiment of the present application.

As shown in FIG. 13, the second embodiment of the communication device of the present application includes a processor 210 and a memory 220.

The processor 210 controls the operation of the communication device. The processor 210 may also be referred to as a CPU (Central Processing Unit). The processor 210 may be an integrated circuit chip, capable of processing signal sequences. The processor 210 can also be a general-purpose processor, a digital signal sequence processor (DSP), an application-specific integrated circuit (ASIC), an off-the-shelf programmable gate array (FPGA) or other programmable logic devices, discrete gate or transistor logic devices, discrete hardware components. A general-purpose processor may be a microprocessor, or the processor may be any conventional processor, or the like.

The memory 220 stores instructions and data required for the processor 210 to work.

The processor 210 is configured to execute instructions to implement the methods provided in the third and/or fourth embodiments and possible combinations of the hybrid automatic repeat request feedback method of the present application.

Figure 14:
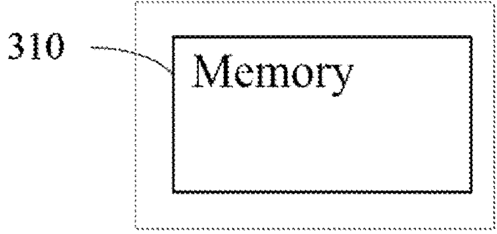
FIG. 14 is a schematic structural diagram of a computer readable storage medium according to an embodiment of the present application.

As shown in FIG. 14, an embodiment of the readable storage medium of the present application includes a memory 310. The memory 310 stores program data. When the program data is executed, the method provided by any embodiment and possible combination of the communication method of the present application is realized.

The memory 310 may include a read-only memory (ROM), a random-access memory (RAM), a flash memory, a hard disk, an optical disk, and the like.

In the several embodiments provided in this application, it should be understood that the disclosed methods and devices may be implemented in other ways. For example, the device embodiments described above are illustrative only. For example, the division of modules or units is only a logical function division. In actual implementation, there may be another division method. For example, several units or components may be combined or integrated into another system, or some features may be omitted, or not implemented. In another point, the mutual coupling or direct coupling or communication connection shown or discussed may be through some interfaces, and the indirect coupling or communication connection of devices or units may be in electrical, mechanical or other forms.

The units described as separate components may or may not be physically separate. Components shown as units may or may not be physical units. That is, it can be located in one place, or it can also be distributed to multiple network elements. Part or all of the units can be selected according to actual needs to achieve the purpose of the solution of this embodiment.

In addition, each functional unit in each embodiment of the present application may be integrated into one processing unit, each unit may be physically included separately, or two or more units may be integrated into one unit. The above-mentioned integrated units can be implemented in the form of hardware or in the form of software functional units.

If the integrated unit is realized in the form of a software function unit and sold or used as an independent product, it can be stored in a computer-readable storage medium. Based on such an understanding, the essence of the technical solution of this application or the part that contributes to the prior art or all or part of the technical solution can be embodied in the form of software products. The computer software product is stored in a storage medium and includes several instructions to enable a computer device (which may be a personal computer, a server, or a network device, etc.) or a processor to execute all or part of the steps of the methods described in various embodiments of the present application. The aforementioned storage medium includes U disk, mobile hard disk, read-only memory (ROM), random access memory (RAM), magnetic disk or optical disk and other media that can store program codes.

The above description is only the implementation manner of the present application and does not limit the patent scope of the present application. Any equivalent structure or equivalent process transformation made by using the contents of the specification and drawings of this application, or directly or indirectly used in other related technical fields, is also included in the scope of patent protection of this application.

What is claimed is:

1. A wireless communication method applied to a base station side, comprising:

configuring an initial downlink bandwidth (BWP) of a reduced capability (REDCAP) user equipment through an information element, wherein an initial downlink BWP of the REDCAP user equipment is independent from an initial downlink BWP of a conventional user equipment, and at least one time-frequency resource of the initial downlink BWP of the REDCAP user equipment is different from at least one time-frequency resource of the initial downlink BWP of the conventional user equipment, wherein time-frequency resources of the initial downlink BWP of the REDCAP user equipment is time division multiplexed or frequency division multiplexed with time-frequency resources of the initial downlink BWP of the conventional user equipment; and using the initial downlink BWP of the REDCAP user equipment to transmit initial access-related signals that is configured for the REDCAP user equipment;

wherein the initial downlink BWP of the REDCAP user equipment comprises a synchronization signal, a physical broadcast channel (PBCH) block (SSB), and a control resource set (CORESET #0), and the CORESET #0 comprises the time-frequency resources used for scheduling a downlink control information of a system information block (SIB1);

wherein using the initial downlink BWP of the REDCAP user equipment to transmit the initial access-related signals that is configured for the REDCAP user equipment comprises:

determining a multiplexing mode of the SSB and the CORESET #0, wherein if a working frequency band of the REDCAP user equipment is FR2, reducing a use of multiplexing mode 2 whose subcarrier spacing is {240 KHz, 120 KHz};

transmitting the SSB and the CORESET #0 in the multiplexing mode.

2. The method according to claim 1, wherein:

determining the initial downlink BWP of the REDCAP user equipment comprises:

obtaining the initial downlink BWP of the REDCAP user equipment from a high layer information element.

3. The method according to claim 1, wherein:

a working frequency band of the REDCAP user equipment is FR2, and determining the SSB of the REDCAP user equipment and a multiplexing mode of the CORESET #0 based on information of the REDCAP user equipment comprises:

reducing a use of multiplexing mode 2 with a subcarrier spacing of {240 KHz, 120 KHz}.

4. A wireless communication method applied to a limited capability user equipment, comprising:

being configuring with an initial downlink BWP of the REDCAP user equipment through an information element, wherein the initial downlink BWP of the RED- CAP user equipment is independent from an initial downlink BWP of a conventional user equipment, and at least one time-frequency resource of the initial downlink BWP of the REDCAP user equipment is different from at least one time-frequency resource of the initial downlink BWP of the conventional user equipment, wherein time-frequency resources of the initial downlink BWP of the REDCAP user equipment is time division multiplexed or frequency division multiplexed with time-frequency resources of the initial downlink BWP of the conventional user equipment; and using the initial downlink BWP of the REDCAP user equipment to receive initial access-related signals;

wherein the initial downlink BWP of the REDCAP user equipment comprises a synchronization signal, a physical broadcast channel (PBCH) block (SSB), and a control resource set (CORESET #0), and the CORESET #0 comprises the time-frequency resources used for scheduling a downlink control information of a system information block (SIB1);

wherein using the initial downlink BWP of the REDCAP user equipment to transmit the initial access-related signals that is configured for the REDCAP user equipment comprises:

determining a multiplexing mode of the SSB and the CORESET #0, wherein if a working frequency band of the REDCAP user equipment is FR2, reducing a use of multiplexing mode 2 whose subcarrier spacing is {240 KHz, 120 KHz};

transmitting the SSB and the CORESET #0 in the multiplexing mode.

5. The method according to claim 4, wherein:

determining the initial downlink BWP of the REDCAP user equipment comprises:

obtaining the initial downlink BWP of the REDCAP user equipment from a high layer information element.

6. The method according to claim 4, wherein:

a working frequency band of the REDCAP user equipment is FR2, and determining the SSB of the REDCAP user equipment and a multiplexing mode of the CORESET #0 based on information of the REDCAP user equipment comprises:

reducing a use of multiplexing mode 2 with a subcarrier spacing of {240 KHz, 120 KHz}.

7. A wireless communication device, comprising: a processor and a memory, wherein the memory is used to store program data, and the program data is executed by the processor to:

determine an initial downlink BWP of the REDCAP user equipment through an information element, wherein the initial downlink BWP of the REDCAP user equipment is independent from an initial downlink BWP of a conventional user equipment, and at least one time-frequency resource of the initial downlink BWP of the REDCAP user equipment is different from at least one time-frequency resource of the initial downlink BWP of the conventional user equipment, wherein time-frequency resources of the initial downlink BWP of the REDCAP user equipment is time division multiplexed or frequency division multiplexed with time-frequency resources of the initial downlink BWP of the conventional user equipment; and use the initial downlink BWP of the REDCAP user equipment to receive initial access-related signals;

wherein the initial downlink BWP of the REDCAP user equipment comprises a synchronization signal, a physical broadcast channel (PBCH) block (SSB), and a control resource set (CORESET #0), and the CORESET #0 comprises the time-frequency resources used for scheduling a downlink control information of a system information block (SIB1);

wherein using the initial downlink BWP of the REDCAP user equipment to transmit the initial access-related signals that is configured for the REDCAP user equipment comprises:

determining a multiplexing mode of the SSB and the CORESET #0, wherein if a working frequency band of the REDCAP user equipment is FR2, reducing a use of multiplexing mode 2 whose subcarrier spacing is {240 KHz, 120 KHz};

transmitting the SSB and the CORESET #0 in the multiplexing mode.

8. The wireless communication device according to claim 7, wherein:

determining the initial downlink BWP of the REDCAP user equipment comprises:

obtaining the initial downlink BWP of the REDCAP user equipment from a high layer information element.

9. The wireless communication device according to claim 7, wherein:

a working frequency band of the REDCAP user equipment is FR2, and determining the SSB of the REDCAP user equipment and a multiplexing mode of the CORESET #0 based on information of the REDCAP user equipment comprises:

reducing a use of multiplexing mode 2 with a subcarrier spacing of {240 KHz, 120 KHz}.

* * * * *